United States Patent [19]

Church et al.

[11] 4,201,596

[45] May 6, 1980

[54] CONTINUOUS PROCESS FOR CELLULOSE SACCHARIFICATION

[75] Inventors: John A. Church; Derek Wooldridge, both of Princeton; Reginald L. Burroughs, Trenton, all of N.J.; Adolph A. Strzepek, Easton, Pa.; William J. Thompson, Lambertville, N.J.

[73] Assignee: American Can Company, Greenwich, Conn.

[21] Appl. No.: 2,885

[22] Filed: Jan. 12, 1979

[51] Int. Cl.$^2$ .............................................. C13K 1/02
[52] U.S. Cl. ........................................ 127/37; 127/1; 127/28; 260/347.9; 435/163; 435/165
[58] Field of Search ............... 127/1, 28, 37; 435/163, 435/165; 260/347.9

[56] References Cited

U.S. PATENT DOCUMENTS

| | | | |
|---|---|---|---|
| 2,086,701 | 7/1937 | Dreyfus | 127/37 |
| 3,523,911 | 8/1970 | Funk | 127/37 |
| 3,817,786 | 6/1974 | Algeo | 127/37 |
| 4,023,982 | 5/1977 | Knauth | 127/37 |
| 4,072,538 | 2/1978 | Fahn | 127/37 |

*Primary Examiner*—Sidney Marantz
*Attorney, Agent, or Firm*—Robert P. Auber; Ira S. Dorman; George P. Ziehmer

[57] ABSTRACT

A continuous process for effecting the acid hydrolysis of cellulosic waste materials, at high solids and in a most economically desirable manner. The process may be controlled to produce, as primary products, glucose, furfural and/or xylose. By appropriate control of water and temperature, through the use of direct steam injection, high solids feedstocks may quickly be converted, in good yields, to valuable products, thus making the process very attractive from a practical commercial standpoint.

17 Claims, 1 Drawing Figure

CONTINUOUS PROCESS FOR CELLULOSE SACCHARIFICATION

BACKGROUND OF THE INVENTION

Traditionally, used paper and agricultural by-products, such as sawdust, wood waste, corncobs, straw, sugar cane bagasse, rice hulls and the like, have been regarded essentially as waste materials, and have been disposed of through incineration or by other, similarly unproductive, means. It is well known that the cellulosic constitutents of such materials can be hydrolyzed to produce more valuable products; however, such operations are in limited use, due largely to the relatively low return-on-investment which they are capable of generating. The capital expenditures required to design and construct the facilities necessary for carrying out such recovery operations tend to be very significant, thus demanding that relatively high conversion rates be attainable, in order to justify the expense involved. Moreover, the ready availability of the same or similar reaction products from alternative sources and at relatively low cost renders it that much more difficult to justify the adoption and use of any new scheme.

The presently known methods of hydrolyzing cellulosic materials are not, by-and-large, considered to be commercially feasible, for a number of reasons. In certain instances, the processes are not readily adapted to continuous operation; they typically require excessively long reaction times, and the reactions are normally carried out at low solids concentrations, all of which seriously limits productivity. Moreover, the known methods do not afford such control as would enable utilization for the production of end products having the highest value and greatest salability.

Accordingly, it is the primary object of the present invention to provide a novel process for the continuous saccharification of cellulosic waste materials.

It is also an object of the invention to provide such a process in which reaction times are relatively short, the reactions are effected at relatively high solids concentrations, and in which such control is afforded as will promote the production of end products that are of relatively high value.

A more specific object is to provide such a process in which the cellulosic constitutents of typical waste products may be converted on a commercial basis into glucose, furfural and xylose, from the hydrolyzate of which ethyl alcohol and xylitol may be produced.

Yet another object is to provide such a process which may be carried out economically and relatively conveniently, utilizing a reactor system which is simple and inexpensive to construct and operate.

SUMMARY OF THE INVENTION

It has now been found that the foregoing and related objects of the present invention are readily attained in a continuous process for the saccharification of cellulosic materials utilizing, as the feedstock, an aqueous mixture of such a material containing from about 15 to about 45 weight percent of solids. The mixture is substantially continuously introduced into one end of a tubular reactor, while the other end of the reactor is constricted so as to develop a back pressure therein. A strong mineral acid is admixed with the cellulosic material in a concentration appropriate to catalyze the hydrolysis thereof, and steam is substantially continuously injected into the mixture at a location downstream from the "one" end of the reactor. The steam produces a reaction mass containing about 10 to about 25 weight percent solids, and is injected in an amount sufficient to maintain the temperature of the reaction mass at about 160° Centigrade to about 240° Centigrade, to thereby effect hydrolysis of the material in the presence of the acid; solids content of the reaction mass will be about 50 to 85 percent of that of the aqueous feed mixture. Thereafter, the reaction mass is substantially continuously passed into and through a reaction zone of the reactor, located downstream from the steam injection location. The length of the reaction zone and the rate of feed mixture introduction are so selected and controlled as to afford an average residence time of about one to ten minutes for each increment of the reaction mass in the reaction zone, with the back pressure therewithin being about 90 to 400 pounds per square inch, gauge. Finally, the reaction mass is substantially continuously dischared from the reactor, and the products of saccharification are recovered therefrom.

In one embodiment of the process, the steam is injected in an amount sufficient to maintain the reaction mass at a temperature of at least about 190° Centigrade, so as to optimize the production of glucose and furfural. Preferably, in such an embodiment, the feed mixture will contain about 30 to 40 weight percent solids, the reaction mass will contain about 20 to 25 weight percent solids and will have a temperature of about 200° to 225° Centigrade, the reaction zone back pressure will be about 250 to 300 pounds per square inch, and the residence time in the reaction zone will be about three to seven minutes, with the reaction mass passing therethrough in substantially plug flow fashion.

In a second embodiment of the process, the steam is injected in an amount sufficient to maintain the reaction mass at a temperature of less than about 180° Centigrade, so as to favor the production of xylose. Preferably, in that embodiment, the feed mixture will contain about 15 to 20 weight percent of solids, the reaction mass will contain about 10 to 15 weight percent of solids, the reaction zone back pressure will be about 100 to 110 pounds per square inch, and the residence time in the reaction zone will be about two to three minutes. The process of this embodiment may be extended by repeating the steps thereof in sequence, with the steam being injected the second time in an amount sufficient to maintain the reaction mass at a temperature of at least about 190° Centigrade, so as to promote further conversion of cellulose to glucose.

Normally in the discharging step of the process, the reaction mass will be subjected to an abrupt pressure reduction (with or without auxiliary cooling), thereby cooling the mass and terminating the reactions therein, whereby a fraction of the hydrolyzate vaporizes and may be separately recovered. In the event that the hydrolysis is effected at 190° Centigrade or above, the vaporized fraction will comprise furfural as the desired product, although a major amount of steam and some acetic acid, will also be present. Most desirably, the hydrolyzate will be neutralized to a pH of about 4 to 7, and generally calcium carbonate will be utilized for that purpose. The process will also normally include the additional step of filtering the hydrolyzate to effect the removal of solids therefrom. Furthermore, it may include steps of introducing yeast into the hydrolyzate, and of establishing conditions suitable for effecting fermentation of the sugars contained therein, for the production of ethanol.

Typically, the acid employed as the catalyst for the process will be sulfuric, and will produce an apparent pH in the reaction mass of less than about 1.0. Most desirably (particularly when the feed has a solids content at the upper end of the range), the acid will be admixed substantially continuously, and at the location at which the steam is injected. Among the cellulosic source materials which may be utilized in the process are included sawdust, wood waste, corncobs, straw, sugar cane bagasse, rice hulls, paper, delignified forms of the foregoing, and mixtures thereof.

DETAILED DESCRIPTION OF THE PREFERRED EMBODIMENTS

Exemplary of the efficacy of the present invention are the following examples wherein (as throughout the specification and claims hereof) solids contents are expressed on an airdry basis and percentages are on a weight basis, unless otherwise stated.

EXAMPLE ONE

Commercial hardwood sawdust, having a mesh size of 5 to 10, was given a light screening to remove oversized shreds, and was admixed with sufficient water to provide a mixture containing 37 percent of solids (equivalent to a solids content of 34.8 percent on an oven dry basis); the mixture was dry in appearance, and non-flowing. It was forced into a 1½ inch diameter pipe reactor 34 feet in length and 0.48 cubic foot in volumetric capacity, which reactor was fitted with a pressure-responsive value at its discharge end, controlled by a loop circuit to maintain a pressure of about 250 pounds per square inch in the reaction zone. Introduction of the sawdust occurred substantially continuously, by alternately charging slugs of it from two different hoppers into the inlet section of the reactor, using a high solids reciprocating pump, to be more fully described hereinbelow. Feeding was carried on for a period of 10 minutes after the reactor had been preheated to 205° Centigrade with steam at 400 pounds per square inch pressure. Sulfuric acid (at a concentration of 32.2 percent) was continuously injected near the point of steam introduction; it was charged at a rate sufficient to maintain a concentration of 1.5 percent, based upon the total contents of the reactor, and steam was injected at a rate sufficient to maintain the 205° Centigrade temperature in the reaction zone. After the addition of the steam and acid, the sawdust solids were present at a concentration of 21.9 percent. The rate of throughput of the reaction mass resulted in a residence time in the heated reaction zone of 5.4 minutes, assuming passage occured in plug flow (i.e. unmixed) fashion. The pressure valve at the discharge end of the reactor opened and closed in rapid cycles, relieving the hydrolyzed material through a cooling section of the system and into a receiving tank, which was equipped with a reflux condenser.

The hydrolyzate was neutralized with limestone to a pH of about 7.0, and filtered. Upon analysis, it was found that a glucose concentration of 4.72 percent, and a furfural concentration of 1.23 percent, had been produced, which corresponds to a recovery of 45 percent of the potential glucose (fed as cellulose and glucomannan hemicellulose in the sawdust), and a recovery of 39 percent of the potential furfural (fed as xylan hemicellulose); mannose and galactose were also present in a total concentration of about 0.3 percent. After removal of the residual furfural by steam distillation, and the performance of other appropriate pretreatment operations, the resultant sugar solution is inoculated with yeast, to effect fermentation to ethanol, and other end products.

EXAMPLE TWO

A reactor system similar to that utilized in carrying out Example One was employed, with the exception that the reactor had a length of 12½ feet and volumetric capacity 0.18 cubic foot, and that it was continuously fed with a progressing cavity pump, rather than the high solids pump referred to therein. The sawdust was feed as a 12 percent solids aqueous mixture, and the acid was premixed therewith (at a level of 20 percent of the dry weight of sawdust) rather than being injected along with the steam. After the introduction of steam, the sawdust concentration was 9.2 percent and the acid was present in a concentration of 1.84 percent, based upon the reactor contents. The reaction mass was maintained at a temperature of 170° Centigrade, and its residence time in the reaction zone was 1.84 minutes. After removal of the unreacted sawdust by filtration, the hydrolyzate was analyzed, and found to have a xylose concentration of 4.6 percent. The xylose concentration corresponds to a recovery of about 73 percent of theoretical, fed as xylan hemicellulose, and the xylose: glucose ratio present therein made the hydrolyzate suitable for xylitol production on a commercial basis.

DETAILED DESCRIPTION OF ILLUSTRATED EMBODIMENT

Figure 1:
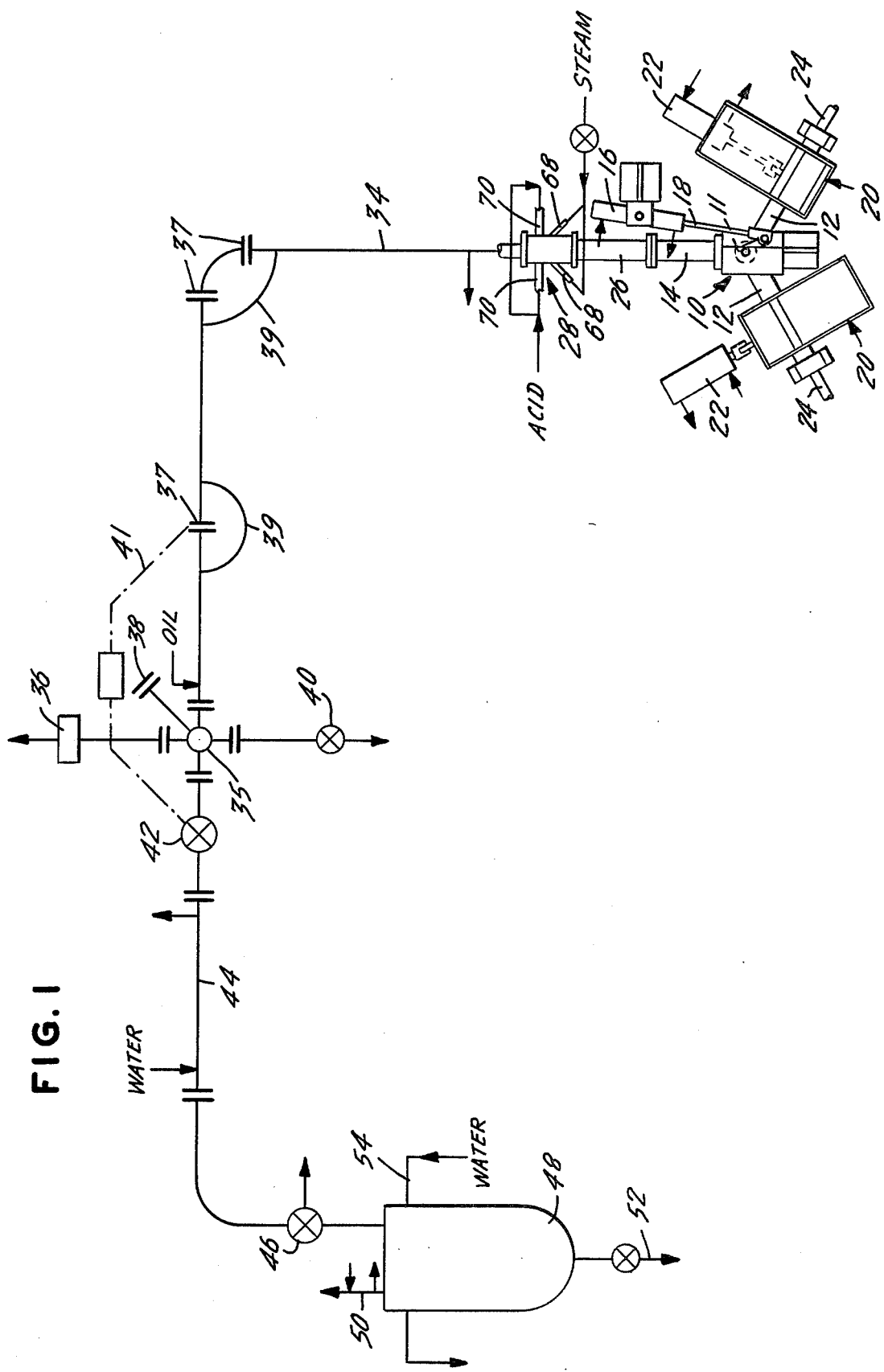
FIG. 1 is a schematic illustration of a reactor system suitable for use in carrying out the process of the present invention.

Turning now in detail to the drawing, therein illustrated schematically is a reactor system suitable for use in practicing the process of the present invention, and comprised of a high solids pump connected to a jacketed pipe reactor through a buffer zone and a steam and acid injection block, all to be described in greater detail; the reactor is relieved into a product collection tank, which also will be more fully described.

The pump section consists of a ball valve unit, generally designated by the numeral 10, the ball 11 of which has formed therethrough a single, accurately-machined, uniform-diameter curved channel (not seen in FIG. 1), so located as to provide communication alternately between one of the feed barrels 12 and the outlet pipe 14 extending therefrom. The ball 11 of the valve 10 is mounted for rotation to alternatingly register its channel with one of the barrels 12, and it is so driven by the hydraulic cylinder 16, through the piston rod 18 thereof.

The pump 10 employs a pair of hoppers, generally designated by the numeral 20, each of which is pivotably mounted over one ,f the charging barrels 12 and are shifted hydraulically (by associated cylinders 22) between filling and charging positions. Briefly, each of the hoppers 20 opens and closes to deposit its charge into the associated barrel 12, with its associated ram 24 in its fully withdrawn position. The barrels 12 are alternately unloaded by the action of the reciprocating feed rams 24, which are slideably mounted therein, with the movement of the hoppers 20 and ball 11 of the valve 10 occuring in timed sequence in response to movement of the rams 24. The details of the reciprocating pump section thus briefly described are set forth in a commonly assigned application for United States Letters Patent entitled "Reactor System and Pump Apparatus Therein," filed on even date herewith in the names of Reginald Livingstone Burroughs, William James Thompson, and Derek Wooldridge, and bearing Ser. No. 2,886.

The outlet pipe 14 is connected to a buffer zone pipe section 26 which, in turn, is connected to an injection block, generally designated by the numeral 28. The block 28 is fitted with conduits 68, through which is injected steam, and with conduits 70, for acid injection. From the injection block 28, the mixture of cellulosic material, acid and steam is forced into the jacketed reaction zone 34, which is provided with means for hot oil circulation, to minimize heat losses and to ensure that the desired temperatures are maintained therein; the reactor also has instrumentation flanges 37 and oil jumpovers 39 at appropriate locations along its length. Adjacent the discharge end of the reaction zone 34 is a five-way cross 35, which is included to permit the incorporation of a rupture disk 36, an air leg 38, and a manual dump and clean out valve 40. The main process valve 42 is located downstream of the five-way cross 35, and is automatically operated through an appropriate loop circuit 41 to maintain the desired pressure in the reaction zone, by periodically opening to discharge material, and thereby to relieve the internal pressure.

The discharged material proceeds through a cooling section 44, which is provided to ensure that the temperature of the reaction mass is rapidly reduced, to thereby quickly terminate the reaction. Then the material passes through a valve 46, providing an alternate product discharge conduit, and ultimately into a product collection tank 48. The collection tank 48 is fitted with a condenser 50, by which vaporous products (such as furfural) may be condensed and recovered; it also has a valved bottom discharge conduit 52, and cooling jacket 54, should it be necessary or desirable to lower the temperature of the product within the tank 48.

GENERAL DISCLOSURE

While the process of cellulose hydrolysis is complex, the chemistry involved is quite well known. When heated with dilute aqueous acid, the glycosidic bonds which connect the individual anhydroglucose units to one another in the cellulose molecule are cleaved by acid catalysis, and one molecule of water adds to each anhydroglucose unit to form one molecule of free glucose. Similarly, the bonds of the hemicellulose molecule are cleaved to produce from xylan free molecules of xylose. Whereas the xylan conversion occurs at a relatively low temperature, preferably at about 170° Centigrade, the conversion of the cellulose to glucose best occurs under more severe conditions, the optimum temperature being about 205° Centigrade. Accordingly, through proper temperature control, the process of the present invention can be adapted to optimize the production of either xylose or glucose.

However, it is not possible to produce maximum amounts of both of those products in a one phase method, due to the fact that xylose dehydrates to furfural under the conditions which most efficiently effect the conversion of cellulose to glucose. Conversely, when the reaction is controlled to maximize the production of xylose, the cellulose conversion will be incomplete. Consequently, if it is desired to obtain from one reaction mass maximum amounts of both xylose and also glucose, a two-phase process may be employed, the first phase of which is carried out under relatively mild conditions, with the conditions of the second being more severe, as decribed hereinabove. Of course, the xylose produced will be removed from the reaction mass prior to carrying out the second phase of the operation.

With specific regard to the production of glucose and furfural, the temperature in the reaction zone should be maintained at about 190° to 225° Centigrade; preferably, it will be about 200° to 210° Centrigrade, although temperatures as high as 240° Centigrade may be feasible. If, however, the temperature is maintained at too high a level, there will be a tendency for excessive corrosion of the hardware to occur at a high rate, and difficult handling problems will be caused by the high pressures attendent to such temperatures. For example, whereas the pressure which will exist in a reaction mass at 205° Centigrade will be about 250 pounds per square inch, raising the temperature to 220° Centigrade will produce a pressure of about 400 pounds per square inch. On the other hand, if the temperature is too low, the reaction time will be excessive, and the conversion to desired products will not be achieved at the optimum levels. Whereas the pressure may be at about 200 to 400 pounds per square inch, gauge, preferably it will be in the range of about 250 to 300 pounds per square inch, it being appreciated that normally the pressure will simply be a function of the reaction temperature.

Concerning residence time for the glucose/furfural reaction, generally the mass will be in the reaction zone for a period of about one to ten minutes, with three to seven minutes being preferred. It is, of course, desirable to minimize the residence time, since doing so will maximize the productive utilization of the system. However, if the reaction time is inadequate, the conversion will be incomplete, and the desired products will not be obtained in the optimum proportions and amounts. On the other hand, excessive residence times will tend to cause degradation of glucose to 5-hydroxymethylfurfural, and further degradation thereof to levulinic acid, neither of which is a particularly valuable commercial commodity.

In the reaction mass, the optimum amount of water (subsequent to steam injection) is about 75 to 80 percent for the glucose/furfural reaction. It is most important that the concentration of water be controlled to achieve such values, since the water serves a number of fundamental purposes. Firstly, it is a reactant (i.e. necessary for hydrolysis); secondly, it provides physical mobility of the reaction mass through the reactor system, and finally, it provides a medium or vehicle for efficient heat and reagent transfer to the cellulosic material, which transfer is, of course, imperative to the achievement of reaction efficiency at low residence times.

In regard to the more mild reaction conditions under which xylose is preferentially produced, the temperature will appropriately be maintained in the range of about 160° to 180° Centigrade, with 170° Centigrade being preferred. Obviously, too high a temperature will promote the production of furfural rather than xylose, whereas too low a temperature will be inefficient. Pressures associated with such reaction temperatures will normally range from about 90 to 120 pounds per square inch, gauge, with values of about 100 to 110 pounds per square being preferred. Residence times in the reaction zone will generally be from about one to five minutes, and most desirably they will be about two to three minutes in duration. Finally, the concentration of solids in the reaction zone, following steam injection and acid addition, should be about 10 to 15 percent by weight.

Thus, as will be noted, when the reaction is carried out to produce xylose, not only are the reaction conditions milder but the solids concentration of the feed mixture is also considerably lower. These two factors are intimately related, in that the need to use less highly concentrated feed mixtures arises from the milder reacton conditions which are established. Because the cellulosic material is degraded to a far lesser extent in the xylose reaction than it is in the more severe glucose conversion, considerations of heat and reagent transfer, viscosity and mobility of the mass through the system demand the presence of significantly more water.

Concerning the condition of the raw material entering the system, it should be appreciated that, even at the lower end of the solids concentration range, the mixture will be relatively dry, and virtually non-flowable. Thus, the mixture will maintain its shape even when deposited in an unconfined pile, and, of course, that is particularly true of the material most suitable for use in the glucose conversion reaction.

More particularly, the feedstock for glucose and furfural production, as introduced into the reactor system, should have a solids concentration of about 20 to 45 percent, and preferably about 30 to 40 percent. Since the concentrations of glucose and furfural produced will be proportionate to the percent of solids in the feed, that represents an important economic variable, which is to be maximized. On the other hand, it may be practical to carry out the glucose/furfural process with a solids concentration in the feed material as low as 20 percent; however, with the type of high solids pump described, materials containing less than about 30 percent solids are somewhat difficult to handle. If the feed material is either too dry or contains particles which are too large, it will clog the system and tend to dewater, so that ultimately, all movement through the reactor will cease. Such a condition will normally occur at solids concentrations in excess of about 45 percent, or when the particle size is excessive. Provision of the uniform cross section channel through the ball 11 of the valve 10, as described above and more fully in the companion application (the specification of which is, to that extent, hereby incorporated), is most important to avoidance of the "hang-up" and dewatering effects.

While any of the cellulose-containing materials herein described, and others evident to those skilled in the art, may be employed in the process of this invention, a particularly desirable source is sawdust, from the standpoint of the value of the products which are produced. On the other hand, although the products obtained utilizing waste paper as the cellulose source are of a less desirable nature, from the commercial standpoint, the process is nevertheless beneficially used therewith, since it provides an economically attractive means for disposing of a waste product material, that otherwise presents costly and difficult problems. A suitable feed material for the production of xylose as the preferential product is 20 mesh barley straw; a less-expensive, comparably desirable feedstock for that purpose is corncobs.

When the glucose/furfural reaction is completed, the raw hydrolzate will contain hexose sugars (4 to 5 percent glucose and 0.1 to 0.5 mannose), 0.5 to 1.5 percent furfural, lignin, humins (unknown sugar degradation products) and small amounts of other products, including acetic and formic acids, 5-hydroxymethylfurfural, methanol and phenols. The content of furfural is especially dependent upon the nature of the cellulose source material; for example, sawdust and corncobs produce relatively high concentrations, whereas the amounts produced from newspaper are relatively low.

A substantial proportion of furfural is recovered from the hydrolyzate simply by virtue of the flashing which normally accompanies the pressure reduction that occurs when the reactor is relieved into the receiving tank; furfural-laden vapors are readily condensed and collected. However, to recover the greatest portion of the furfural present in the hydrolyzate, a second recovery stage may be advisable.

Utilizing the process of the present invention, typical yields of glucose that can be obtained are 52 percent of theoretical, when corncobs are used as the source material, and 35 percent of theoretical when the feedstock comprises newspaper. It is believed that the higher the proportion of lignin contained in the source material, the lower will be the ultimate yield of glucose. Furfural yields as high as 60 percent or more of theoretical are possible; however, the attainment of such high percentages requires overcooking of the reaction mass, with the attendant reduction in the amount of glucose recovered, so that generally preferred practice will be to control the reaction so as to yield about 30 to 50 percent of the theoretical amount of furfural. Finally, xylose yields in the range of about 60 to 80 percent of theoretical are typically obtained, under appropriate reaction conditions and with a suitable raw material. Moreover, the xylose is produced in a relatively pure (i.e., glucose-free) state, thus making the hydrolyzate a good commercial source for xylitol; specifically, xylose: glucose ratios of 10:1 or higher are obtained.

Virtually any strong mineral acid may be employed to catalyze the hydrolysis reaction, suitable candidates including hydrochloric acid, phosphoric acid, nitric acid and the like. Nevertheless, sulfuric acid is the preferred reagent, both from the standpoint of cost and also due to the relatively low levels of corrosion which it tends to cause. Specifically, the sulfuric acid may be utilized as a 96 percent pure substance, diluted with water to a concentration of approximately 30 percent. In the reactor, the sulfuric acid should be present in an amount of about 1 to 3 percent based upon the total weight of the reaction mass. If too much acid is employed, excessive corrosion will result, the cost of the process will be unnecessarily high, and an undue amount of neutralizing agent will be required upon recovery. While, in the two phase process described, a second charge of acid will normally be made, that is not always necessary. Although there is serious doubt that the expression of the pH of a hot solution is meaningful, it may be appropriate to assign a value of less than about 1.0 with respect to the reaction masses involved in the present process.

The hydrolzate will generally be neutralized to a pH of about 4 to 7, utilizing a suitable inexpensive agent, typically calcium carbonate. Other reagents may, of course, be utilized for the neutralization reaction, among which might be mentioned ammonium hydroxide, which offers the advantage, when the liquor is to be utilized for fermentation, of furnishing a microbial nutrient; ammonium hydroxide also avoids the gypsum produced with limestone, which may be an undesirable byproduct.

The recovery operations will normally include a filtration step to remove the lignin and humins from the raw hydrolyzate. The preferred use to which the residue is put is that of incineration, providing the fuel for generation of the steam necessary in carrying out the process. Normally, prior to incineration, the filter cake will be washed to remove and recover sugars, with the washings being added to the original filtrate. The wash water should be alkaline so that the filter cake does not cause excessive corrosion when burned.

Thus, it can be seen that the present invention provides a novel process for the continuous saccharification of cellulosic waste materials, in which process the reaction times are relatively short, the reaction mass contains a high concentration of solids, and such control is afforded as will promote the production of end products which are of relatively high value. More specifically, the invention provides a process in which the cellulosic constitutents of typical waste products may be converted, on a commercial basis, into furfural, glucose and xylose, from the last two of which ethyl alcohol and xylitol may be produced. The process of the invention may be carried out economically and conveniently, utilizing a reactor system which is simple and relatively inexpensive to construct and to operate. In the process, utilization of high solids mixtures and short residence times maximizes economics, while also promoting the production of products of high market value; the reaction to produce glucose and furfural is a primary feature of the invention. The control of water is also a very significant feature of the invention, particularly in regard to the high solids process; it must be provided in amounts which are stoichiometrically related to the cellulose content, for the hydrolysis reaction, and to provide feedstock mobility and high heat and reagent transfer rates, while also maintaining relatively high solids concentrations to maximize the overall economics of the process. Finally, the temperatures are so controlled as to promote high reaction rates without generating excessive pressures or promoting high levels of corrosion, while being selected to produce the products which are desired.

Having thus described the invention, what is claimed is:

1. A continuous process for the saccharification of cellulosic materials, comprising the steps of:
   (a) substantially continuously introducing into one end of a tubular reactor an aqueous mixture of cellulosic material containing from about 15 to about 45 weight percent solids, and constricting the other end of said reactor so as to develop a back pressure therein;
   (b) admixing a strong mineral acid with said material in a concentration appropriate to catalyze the hydrolysis thereof;
   (c) substantially continuously injecting steam into said mixture, at a location downstream from said one end of said reactor, to produce a reaction mass containing about 10 to about 25 weight percent solids, said steam being injected in an amount sufficient to maintain the temperature of said reaction mass at about 160° Centigrade to about 250° Centigrade, and to thereby effect hydrolysis of said material in the presence of said acid, the solids content of said reaction mass being about 50 to 85 percent of that of said mixture;
   (d) thereafter, substantially continuously passing said reaction mass into and through a reaction zone of said reactor located downstream from the steam injection location, the length of said reaction zone and the rate of mixture introduction being so selected as to afford an average residence time of about one to ten minutes for each increment of said mass in said zone, and said back pressure therewithin being about 90 to 400 pounds per square inch, gauge; and
   (e) substantially continuously discharging said mass from said reactor, and recovering products of saccharification therefrom.

2. The process of claim 1 wherein said steam is injected in an amount sufficient to maintain said reaction mass at a temperature of at least about 190° Centigrade, so as to optimize the production of glucose and furfural.

3. The process of claim 2 wherein said mixture contains about 30 to 40 weight percent solids, wherein said reaction mass contains at least about 20 weight percent solids and is maintained at a temperature of about 200° to 225° Centigrade, wherein said reaction zone back pressure is about 250 to 300 pounds per square inch, and wherein said residence time in said reaction zone is about three to seven minutes, said mass passing therethrough in substantially plug flow fashion.

4. The process of claim 1 wherein said steam is injected in an amount sufficient to maintain said reaction mass at a temperature of less than about 180° Centigrade, so as to favor the production of xylose.

5. The process of claim 4 wherein said mixture contains less than about 20 weight percent solids, wherein said reaction mass contains about 10 to 15 weight percent solids, wherein said reaction zone back pressure is about 100 to 110 pounds per square inch, and wherein said residence time in said reaction zone is about two to three minutes.

6. The process of claim 4 wherein, subsequent to said step (e), said steps are repeated in sequence, said steam being injected in repeated step (c) in an amount sufficient to maintain said reaction mass at a temperature of at least about 190° Centigrade, so as to promote further conversion of cellulose to glucose.

7. The process of claim 1 wherein, in said discharging step, said mass is subjected to an abrupt pressure reduction to cool said mass and terminate the reactions therein, whereby a fraction of the hydrolyzate vaporizes and may be separately recovered.

8. The process of claim 7 wherein said steam is injected in an amount sufficient to maintain said reaction mass at a temperature of at least about 190° Centigrade, and wherein said fraction comprises furfural.

9. The process of claim 8 including the additional step of neutralizing said hydrolyzate to a pH of about 4 to 7.

10. The process of claim 9 wherein said hydrolyzate is neutralized with calcium carbonate.

11. The process of claim 9 including the additional step of filtering said hydrolyzate to effect the removal of solids therefrom.

12. The process of claim 9 including the additional steps of introducing yeast into said hydrolyzate, and of establishing conditions suitable for effecting fermentation of the sugars contained therein.

13. The process of claim 12 wherein ethyl alcohol is produced.

14. The process of claim 1 wherein said acid is sulfuric, and produces an apparent pH in said reaction mass of less than about 1.0.

15. The process of claim 3 wherein said acid admixing step (b) is effected substantially continuously, and at said steam injection location.

16. The process of claim 1 wherein said cellulosic material is selected from the group consisting of sawdust, wood waste, corncobs, straw, sugar cane bagasse, rice hulls, paper, delignified forms of the foregoing, and mixtures thereof.

17. A continuous process for the saccharification of cellulosic materials, to produce glucose and furfural as primary products, comprising the steps of:

(a) substantially continuously introducing into one end of a tubular reactor an aqueous mixture of cellulosic material containing from about 30 to about 40 weight percent solids, and constricting the other end of said reactor so as to develop a back pressure therein;

(b) admixing a strong mineral acid with said material in a concentration appropriate to catalyze the hydrolysis thereof;

(c) substantially continuously injecting steam into said mixture, at a location downstream from said one end of said reactor, to produce a reaction mass containing about 20 to about 25 weight percent solids, said steam being injected in an amount sufficient to maintain the temperature of said reaction mass at about 200° Centigrade to about 225°0 Centigrade, and to thereby effect hydrolysis of said material in the presence of said acid;

(d) thereafter, substantially continuously passing said reaction mass, in substantially plug flow fashion, into and through a reaction zone of said reactor located downstream from the steam injection location, the length of said reaction zone and the rate of mixture introduction being so selected as to afford an average residence time of about three to seven minutes for each increment of said mass in said zone, and said back pressure therewithin being about 250 to 300 pounds per square inch, gauge; and (e) substantially continuously discharging said mass from said reactor, and recovering products of saccharification therefrom.

* * * * *